E. E. KELLER.
SPEED CHANGING MECHANISM.
APPLICATION FILED NOV. 14, 1905.
942,911.
Patented Dec. 14, 1909.
2 SHEETS—SHEET 1.
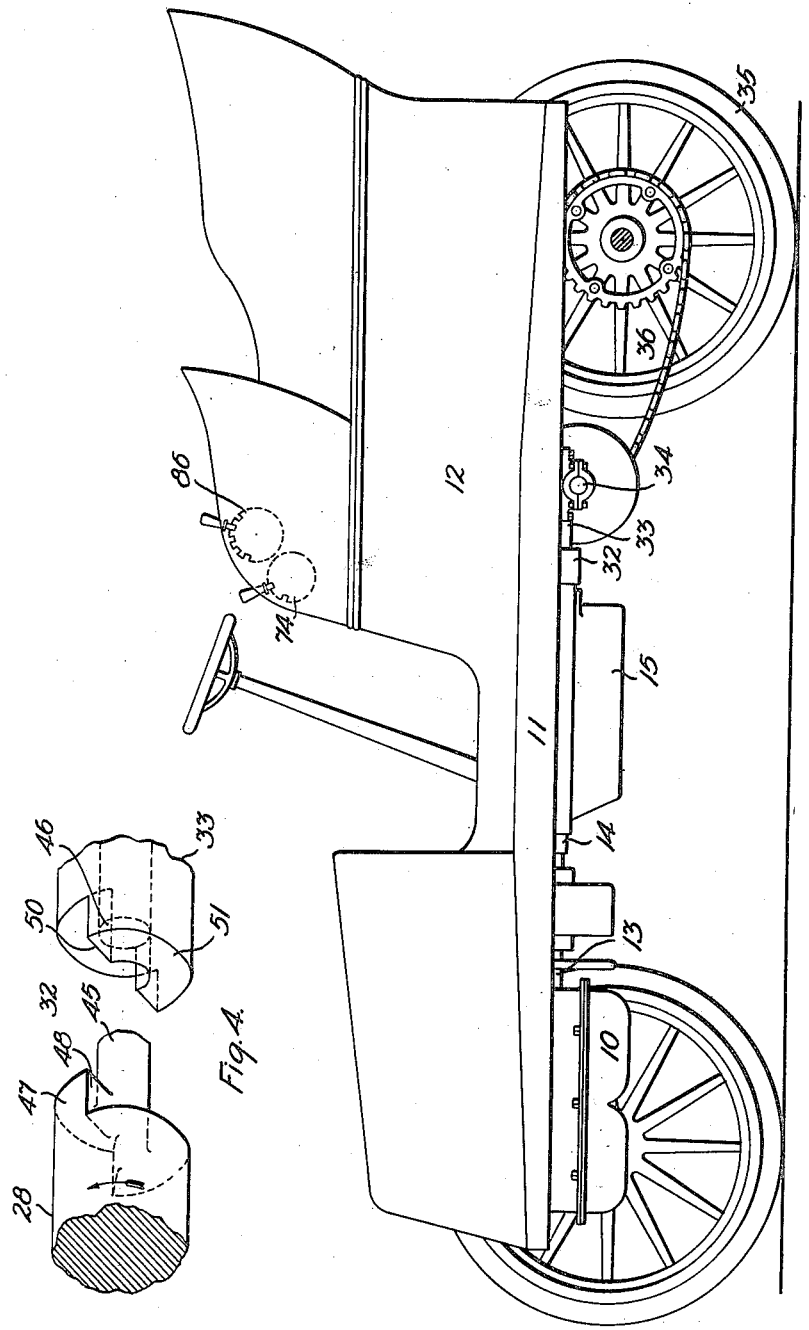

E. E. KELLER.
SPEED CHANGING MECHANISM.
APPLICATION FILED NOV. 14, 1905.
942,911.
Patented Dec. 14, 1909.
2 SHEETS—SHEET 2.
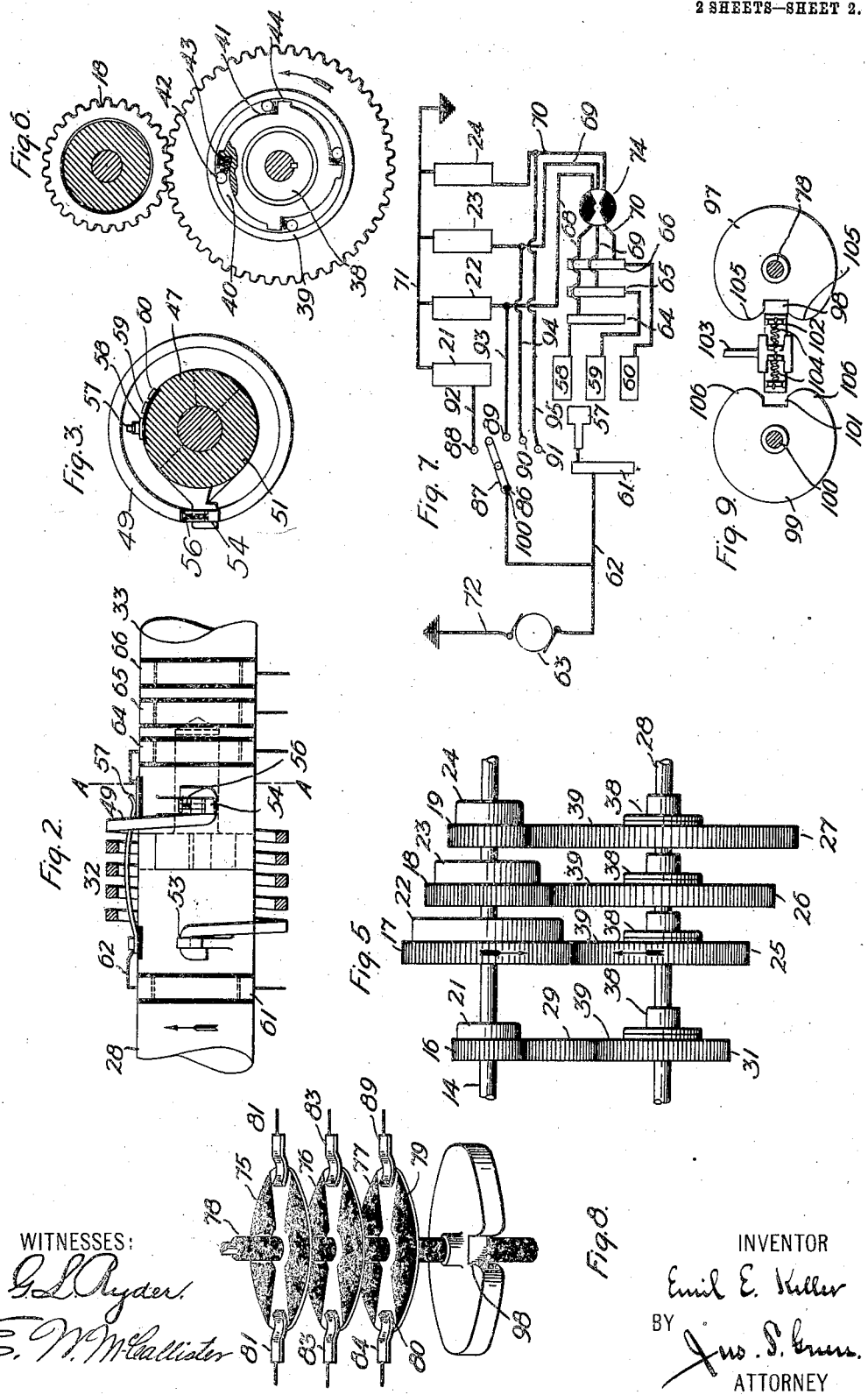

UNITED STATES PATENT OFFICE.

EMIL E. KELLER, OF PITTSBURG, PENNSYLVANIA.

SPEED-CHANGING MECHANISM.

942,911. Specification of Letters Patent. Patented Dec. 14, 1909.

Application filed November 14, 1905. Serial No. 287,313.

*To all whom it may concern:*

Be it known that I, EMIL E. KELLER, a citizen of the United States, and a resident of Pittsburg, in the county of Allegheny and State of Pennsylvania, have invented a new and useful Improvement in Speed-Changing Mechanisms, of which the following is a specification.

This invention relates to speed-changing mechanisms, and has for an object the production of a speed-changing mechanism in which automatic means are utilized for varying the purchase or duty of the mechanism in accordance with the resistance encountered; that is, if the load on a machine, receiving power from a motor or power shaft through the speed-changing mechanism, becomes too heavy or great for a certain speed of the machine, the speed-changing mechanism will automatically shift or change from a high to a lower speed gear with a greater torque or purchase, so that if the power received from the motor or shaft is insufficient for the high speed, it will be rendered effective and sufficient for the lower speed, or if the power delivered by the motor or power shaft be in excess of that required by the machine while running at a low speed, the speed-changing mechanism will automatically shift or change from a low speed gear to a higher speed gear with a smaller torque or purchase.

The torsional resistance encountered in the driving mechanism of the machine is substantially the same whether the machine is running fast or slow, and it is therefore almost directly proportional to the resistance encountered by the machine in performing its work. For this reason, a torsionally controlled speed-changing mechanism will operate effectively for all speeds of the machine and the effort of the engine or power shaft will be practically constant for the ordinary resistances encountered.

My invention is, therefore, particularly adapted for use in connection with the transmission gearings of automobiles, motor cars or locomotives, and when applied to such machines or vehicles, insures an economical and efficient performance of the engine or motor in overcoming the different road resistances.

In the further description of my invention, I will consider it as applied to the transmission mechanism of a motor car, without any idea of limiting its application to such a machine, or even to vehicles.

In the drawings accompanying this application and forming a part thereof, Figure 1 shows a side elevation of a motor car provided with an automatically controlled speed-changing mechanism; two wheels of the car being removed for convenience of illustration. Fig. 2 is a side elevation of a detail of the automatic controlling device embodied in my invention. Fig. 3 is a sectional elevation along the line A A of Fig. 2. Fig. 4 is a partially perspective view of the separate parts of the detail illustrated in Figs. 1 and 2. Fig. 5 is a plan view of a set of speed-changing gears forming a detail of my invention. Fig. 6 illustrates an overrunning device utilized in connection with the speed-changing gears. Fig. 7 is a wiring diagram illustrating the electrical connections utilized in carrying out my invention. Fig. 8 is a perspective view somewhat diagrammatically illustrating a switch forming a detail of my invention. Fig. 9 is a plan view of an interlocking device embodied in my invention.

The transmission mechanism comprises an engine or motor 10, mounted on the frame portion 11 of an automobile or motor car 12. The driving shaft 13 of the engine is coupled or otherwise connected to a shaft 14, journaled in the walls of a gear box 15, which is mounted on the frame portion 11 of the car. Gears 16, 17, 18 and 19 are rotatably mounted on the shaft 14 and are, respectively, provided with magnetic or friction disk clutches 21, 22, 23 and 24, which are electro-magnetically operated for connecting the respective gears to the shaft 14. The gears 17, 18 and 19, respectively mesh with gears 25, 26 and 27, mounted on a shaft 28, and comprise the high, intermediate and low speed gear trains of the transmission mechanism. The gear 16 meshes with a gear 29, which is suitably mounted in the gear box 15 and meshes with a gear 31, mounted on the shaft 28. The shaft 28 is suitably mounted in the gear box 15 and is connected by a torque responsive device 32 to a shaft 33, which is journaled in bearings suitably supported on the frame portion 11. The shaft 33 is provided with suitable gears (not shown) which mesh with other gears (not shown) mounted on a driving shaft 34. The driving shaft 34 operates the driving wheels 35 through a chain-drive 36.

The automatic regulation of the apparatus depends on the fact that, with the road conditions remaining the same and with the motor car well under way, the pull or resistance to motion offered by the back wheels is substantially the same, whether the vehicle is moving fast or slow; that is, the pull on the chain in the driving car will be the same, within close limits, whether the vehicle is climbing a hill at a high speed or at a low speed. The engine, however, will expend more power in propelling the car up a given grade through the high speed than it will in propelling it up the same grade through the low speed. The total work expended on the car is the same in each case, but the time in which the work is done varies.

Since the horse-power delivered by an engine is dependent on the number of revolutions of the fly-wheel in conjunction with certain other constant factors, it is readily seen that an engine of ten horse-power as a maximum might drive the motor car up a given grade through the low-speed gear, where it would require an engine of probably twice the horse-power to accomplish the same feat through the high speed gear. A simple illustration of this is the simple lever in which a certain load may be raised through a unit length by a small force acting at the end of a long force arm, or the same result may be accomplished and the same work done by applying twice the force at the end of a lever arm half as long. The only difference is that the small force moves through twice the distance that the force of twice the strength must move, or the fly-wheel of the ten horse-power engine will make twice as many revolutions as the twenty horse-power engine while driving the car up the grade.

The ordinary gas or gasolene engine does not operate efficiently under varying loads, and it is impossible to efficiently overload them, since an overload slows down the engine and consequently decreases the power delivered. For this reason, my invention is particularly applicable to motor car work, and with its use the load on the engine is kept practically constant by varying the speed of the vehicle, or it might be said, by varying the load arm, through which the effort of the engine is delivered to the car, in accordance with the varying resistances encountered.

The automatic operation of the organized apparatus depends upon the operation of its several parts, which will now be separately described.

*The speed change gears.*—The different sets of gears comprising the high, intermediate and low speed gears are continually in mesh and the set rendered effective in driving the car is nominated and controlled by the torque responsive device 32, which is provided with means for operating the electro-magnetic clutches. The high speed gear train consists of a gear 17, which is rotatably mounted on the shaft 14 and is provided with an automatically controlled clutch 22, and a gear 25, which consists of a hub portion 38, rigidly mounted on the shaft 28, and a rotatably mounted rim portion 39, between which and the hub portion an overrunning device 40 is provided. The intermediate speed gear train consists of a gear 18, which is rotatably mounted on the shaft 14, and is provided with an automatically controlled clutch 23, and a gear 26, which consists of a hub portion 38 rigidly mounted on the shaft 28 and a rotatably mounted rim portion 39, between which and the hub portion an overrunning device 40 is provided. The low speed gear train consists of a gear 19, which is rotatably mounted on the shaft 14, and is provided with an automatically controlled clutch 24, and a gear 27, which consists of a hub portion 38, rigidly mounted on the shaft 28, and a rotatably mounted rim portion 39, between which and the hub portion an overrunning device 40 is provided. The reversing gear train consists of a gear 16, rotatably mounted on the shaft 14, which is provided with a controlling clutch 21, a gear 29 and a gear 31, which consists of a hub portion 38, rigidly mounted on the shaft 28, and a rotatably mounted rim portion 39, and an overrunning device 40 included between the hub portion and the rim portion.

*The overrunning devices.*—Since the gears comprising the different sets are continuously in mesh, it is necessary to provide each of the low speed sets with an overrunning device which will be effective during the operation of a set of higher speed. In this case, the gears 25, 26, 27 and 31 are provided with overrunning devices which are located as has been previously mentioned, between the rigidly mounted hub portion 38 and the rotatably mounted rim portion 39 of the respective gears. In Fig. 6 a section of the intermediate speed gear 26 illustrates the overrunning device. The hub portion 38, which is keyed to the shaft 28, is provided at its periphery with a tapering recess 41, in which clutch or grip rollers 42 are mounted. Coil springs 43 are mounted on suitably extended lugs 44 of the hub portion and are adapted to hold the clutch rollers in contact with the inner periphery of the rim portion 39. The arrangement is such that when the rim 39 is driven by the gear 18 in the direction of the arrow, the rollers 42 will grip the surfaces of the hub and rim portions and lock the rim to the hub; and when the hub portion 38 rotates relative to the rim portion 39, in the direction of the arrow, the clutch rollers will disengage and allow the hub to overrun or move in advance of the rim portion. While it is only necessary to supply the gears 26 and 27 with the overrunning device, it is preferable also to supply the gears 25 and 31 with the device, in order that the said gears may be automatically disconnected from the shaft 28 when their respective gear trains are inoperative.

*The torque responsive device.*—The end of the shaft 28 is provided with a reduced portion 45, which extends into a recess 46 with which the shaft 33 is provided. The shaft 28 is provided with a lug 47, the face 48 of which is normally held by a spring 49 in contact with a face 50 of a lug 51 on the shaft 33. The spring 49 is mounted on lugs 53 and 54, which are formed integrally with the shafts 28 and 33, respectively, and the lugs 47 and 51 are so arranged that considerable relative rotary motion, due to the flexibility of the spring 49, may occur between the shafts 28 and 33. The lug 54 is provided with an adjusting screw 56, and the spring 49 is designed to sustain with little or no distortion the pull of the driving wheels 35 that the engine or motor can efficiently overcome while operating through the high speed gears. Greater pulls or resistances cause the spring 49 to distort definite amounts proportional to the pulls.

An insulated finger 57 is mounted on the shaft 28 and is arranged to successively contact with insulated bars 58, 59 and 60, mounted on the shaft 33. The finger 57 is electrically connected to a slip ring 61, which is connected through a wire 62 to a clutch exciter or source of electricity 63. The insulated bars 58, 59 and 60 are, respectively, connected to insulated slip rings 64, 65 and 66, which are mounted on the shaft 33. The respective slip rings are connected to the operating mechanism of the clutches 22, 23 and 24 through the wires 68, 69 and 70. The clutch operating mechanisms are each connected to the ground of the vehicle through the wire 71, and one terminal of the exciter 63 is connected to the ground through the wire 72.

For certain predetermined limits of slight torsional resistances (or for slight resistances to rotation of the driving wheels) the spring 49 will transmit the effort of the engine to the driving wheels with little or no distortion and the finger 57 will contact with the bar 58, thereby completing an electric circuit from the exciter 63 through the wire 62, the slip ring 61, the finger 57, the bar 58, the wire 68, the operating mechanism of the clutch 22, the wire 71, and through the ground of the vehicle and wire 72 back to the exciter 63, thereby throwing the high speed clutch into operation. A pull of the back wheels, or a resistance, which the engine cannot efficiently overcome while operating through the high speed gears causes the spring 49 to distort a definite amount and the shaft 33 in lagging behind the shaft 28 moves the bar 59 under the finger 57, thereby completing an electric circuit from the exciter 63 through the wire 62, the slip ring 61, finger 57, the bar 59, wire 69, the operating mechanism of the clutch 23, the wire 71, the ground and the wire 72, thereby throwing the intermediate clutch 23 into operation. Resistances that the engine cannot efficiently overcome in operating through the intermediate speed gears cause the spring 49 to distort still further, thereby moving the bar 60 under the finger 57 and completing a circuit from the exciter 63 through the wire 62, the finger 57, the bar 60, the wire 70, the operating mechanism connected with the clutch 24, the ground and the wire 72, thereby throwing the low speed clutch 24 into operation.

The finger 57 is of such a width that one of the insulated bars is always under it, and in passing from one to the next the arrangement is such that the operation of the clutches overlap each other, which is rendered permissible because of the overrunning devices 40. As the road resistance or the pull of the back wheels decreases, the spring 49 will gradually pull the shaft 33 to its normal position relative to the shaft 28 and the intermediate and high speed gears will be successively thrown into operation by the torque responsive device.

*Manual operation.*—In order that the different speed gear clutches may be under the control of the operator, I have introduced a switch 74, which is arranged to throw the automatic controlling device 32 into or out of the clutch controlling circuit. The switch 74 consists of disks 75, 76 and 77, mounted on an insulating post 78, and each of the disks comprises an insulating portion 79 and a conducting portion 80. The wire 68 is broken at the switch and each terminal is provided with brushes 81, which are held in contact with the disk 75 by any suitable means. The wires 69 and 70 are broken at the switch 74, and their terminals are, respectively, provided with brushes 83 and 84, which are held in contact with the respective disks 76 and 77. By this arrangement one movement of the switch 74 throws the automatic controlling device 32 out of the clutch controlling circuit and allows the engine to run free of the transmission mechanism of the motor car. An auxiliary switch or controller 86 is provided for operating the speed change clutches at the will of the operator. The controller 86 may be of any suitable design and is provided with a neutral or stop position, reversing, slow, intermediate and high speed position, and broadly consists of a contact arm 87 adapted to successively contact with stops 88, 89, 90 and 91. The stop 88 is connected with the operating mechanism of the reversing clutch 21 through a wire 92; the stop 89 is connected with the operating mechanism of the clutch 22 through a wire 93; the stop 90 is connected with the operating mechanism of clutch 23 through a wire 94; and the stop 91 is connected with the operating mechanism of the clutch 24 by wire 95. By this arrangement any one of the clutches may be thrown into operation at will.

*The interlocking device.*—A disk 97 is mounted on the post 78 of the switch 74 and is provided with a recess 98. A disk 99 is mounted on a post 100 of the controller 86 and is provided with a recess 101. The switch 74 and the controller 86 are so arranged that when both are turned to the neutral or inoperative position the recesses 98 and 101 are opposite each other. A pin 102 is mounted in suitable ways, with which a bracket 103, mounted on the frame portion 11 of the car, is provided. The pin 102 is held centrally between the disks 97 and 99 by springs 104, which are connected at one end to the bracket 103 and at the other to the pin 102. The arrangement is such that when the switch 74 is moved from the neutral or inoperative position to a position throwing the automatic controlling device into operation, one end of the pin 102 is forced by a cam surface 105 of the disk 97 into the recess 101 of the disk 99, thereby locking the controller 86 in the neutral or inoperative position. When the switch 74 is in the neutral position and the controller 86 is turned to the reversing or any one of the ahead positions, the switch 74 is locked into the inoperative position by the pin 102, which is then forced into the recess 98 by one of the cam surfaces 106 of the disk 99. It is obvious that with this arrangement only one of the controllers can be in the operative position at the same time.

*The automatic operation of the transmission mechanism.*—In starting the engine the switch 74 and the controller 86 are in their inoperative or neutral positions. Upon turning the switch 74 to the operative position the engine in starting the car encounters the greatest resistance that the existing conditions can produce; that is, the friction of rest of the car and the driving mechanism in addition to the existing road resistance. The spring 49 is immediately thrown into tension and the shaft 32 lags behind the shaft 28 a definite amount, corresponding to the resistance encountered, and moves one of the insulated bars under the finger 57 and thereby renders effective the set of speed gears arranged to operate under the encountered resistance. During the operation of the car the torsional resistance encountered, or, more properly, the varying pulls of the back wheels, will automatically control the operation of the clutches 22, 23 and 24, and at all times the engine will be running under practically the same load, and therefore no variations of engine speed will be encountered. Since the torsional resistance encountered by the driving mechanism is substantially independent of the speed, the torsional controlling device will be effective whether the engine is running fast or slow, and the engine or motor car can be throttled or slowed down to any speed without affecting the automatic operation. The automatic controlling device may be relieved of the duty of controlling the clutches by turning the switch 74 to the neutral or inoperative position, and the car will then run free of the engine until the switch 74 is again turned to the operative position, or the controller 86 is thrown into operation. In order that the different gear trains may be automatically rendered effective in transmitting power for definite predetermined resistances encountered, or for certain definite pulls of the driving wheels of the car, the insulated bars 58, 59 and 60 may be so arranged that their relative positions on the shaft 33 can be easily varied. With such an arrangement the bars may be so located that any one will contact with the finger 57 for any predetermined lag of the shaft 33, and the time of operation of the different gear trains can therefore be accurately adjusted in accordance with the give or distortion of the spring 49 and the inequalities of the distortion of the spring 49 may be accurately compensated.

As before stated, this invention is not limited to use in motor vehicles; the principle of the same is particularly applicable to cranes or other lifting or hoisting devices, and it will be understood that the claims, where not specifically limited to motor vehicles, are to be considered broad enough to be read into any power transmission mechanism.

It is obvious that many variations and changes in the details of construction will readily suggest themselves to persons skilled in the art, and still fall within the scope and spirit of this invention, and that many of the features shown and described may be omitted or used either alone or in association with others not shown or described. The invention, therefore, is not limited or restricted to the exact details of construction or arrangement shown and above set forth; but, Having set forth the object of this invention and a form of construction embodying the principle thereof, and having described such construction, the function and mode of operation, what is claimed as new and useful and sought to be secured by Letters Patent is:

1. In a power transmitting apparatus, a plurality of independently operable electrically controlled clutch devices, means by which said devices are caused to separately transmit power, and torque controlled mechanism upon which the operation of said means is dependent.

2. In a power transmitting apparatus, a plurality of electrically operated clutch devices, means by which said devices are caused to separately transmit power, and torque controlled mechanism upon which the operation of said means is dependent.

3. In a power transmitting apparatus, a plurality of independently operable electrically controlled clutch and gearing devices, means by which said devices are caused to separately transmit power and torque controlled mechanism upon which the operation of said means is dependent.

4. In a power transmitting apparatus, a plurality of electro-magnetically operated clutch devices, means by which said devices are caused to transmit power, and torque controlled mechanism upon which the operation of said means is dependent.

5. In a power transmitting apparatus, a plurality of magnetically operated clutch devices and a torque responsive device for controlling the operation of said devices.

6. In a power transmitting apparatus, a plurality of electrically operated clutch devices and torque responsive means for controlling the operation of said clutch devices.

7. In a power transmitting apparatus, in combination with a power shaft, a member rotatable with said shaft and adapted to lag in relation thereto, a plurality of electrically operated clutch devices and means whereby the operation of said clutch devices is dependent upon the amount or degree of such lag.

8. In a power transmitting apparatus adapted for use in automobiles, the combination with a plurality of electrically operated clutch devices, of power transmission gear trains and torque responsive means for designating which of said gear trains is to transmit power.

9. In a power transmitting apparatus for use in automobiles, the combination with a plurality of electrically controlled clutch devices, of power transmitting gear trains and torque responsive means dependent upon the load or road resistances for controlling the operation of said clutch devices.

10. In a power transmitting apparatus, a power shaft, a driven shaft, a plurality of electro-magnetically operated power transmitting clutch devices between said shafts and mechanism dependent upon the load and independent of the speed of the power shaft for nominating which of said devices is to be utilized in transmitting power.

11. In a power transmitting apparatus, a power shaft, a driven shaft, a plurality of electro-magnetically operated power transmitting devices between said shafts and mechanism dependent upon the road resistance and independent of the speed of the power shaft for automatically controlling the operation of said devices.

12. In a power transmitting device for use in automobiles, a power shaft, a driven shaft, a plurality of electro-magnetically operated power transmitting clutch and gearing devices between said shafts and all but one of which are normally inoperative and torque responsive mechanism for nominating which of said devices is to be operated.

13. In a power transmitting apparatus, a plurality of electro-magnetically operated transmission devices and torque responsive mechanism for independently controlling the operation of said devices.

14. In a power transmitting apparatus, a plurality of independently electrically operated turning-moment varying devices and torque responsive means for independently controlling the operation of said devices.

15. The combination with a driving part, of a part to be driven therefrom, an electro-magnetically operated speed-change device, an elastic driving coupling between said device and the part to be driven, which permits of relative angular lag between said parts, the degree of which is dependent upon the load encountered, and means, the operation of which is dependent upon the degree of such lag for automatically controlling the operation of said device.

16. The combination with a driving part, of a part to be driven, an electro-magnetically operated turning-moment varying device, an elastic driving coupling between said device and the part to be driven, which permits of relative angular lag between said parts, the degree of which is dependent upon the load encountered, and means, the operation of which is dependent upon the degree of such lag for automatically controlling the operation of said device.

17. The combination with a driving part, of a part to be driven, a magnetically operated turning-moment varying device, a yielding driving connection between the turning-moment varying device and the part to be driven, which permits of relative angular lag between said parts, and means, the operation of which is dependent upon the degree of such lag for automatically controlling the operation of said device.

18. In combination with a driving part, a driven part and an electro-magnetically operated turning-moment varying device, means between the driven part and said device whereby relative angular lag between said parts is permitted and a controller, the operation of which is dependent upon the degree of such lag for controlling the operation of said device.

19. In a power transmitting apparatus, an electro-magnetically operated turning-moment varying device, a torque responsive agent for controlling the operation of said device, a manually operated controller for said device and means for rendering said torque responsive agent ineffective when said manually operated controller is in operation.

20. In a power transmitting apparatus, an electro-magnetically operated turning-moment varying device, a torque responsive agent for controlling the operation of said device, a controller for manually controlling the operation of said device and means for rendering said torque responsive agent ineffective when said manually operated controller is effective and for rendering said manually operated agent ineffective when said torque responsive agent is effective.

21. In a power transmitting apparatus, a turning-moment varying device, a torque responsive controller for automatically controlling the operation of said device, a manually operated controller for manually controlling the operation of said device and an interlocking agent between said controllers.

22. In a power transmitting apparatus an electrically operated turning-moment varying device, a torque responsive agent for controlling the operation of said device, a manually operated agent for controlling the operation of said device and interlocking means between said agents whereby only one of the same may be operated at a time.

23. In a power transmitting apparatus, a speed change device, an automatic controlling agent and a manually operated controlling agent for said device, and an interlocking means between said agents whereby only one may be operated at a time.

24. In combination with an electrically operated speed change device, an operating circuit for said device, a torque responsive controlling device for said circuit, comprising a driving member, a driven member, a spring connection between said members, and a make and break device for said circuit, the terminals of which are respectively mounted on said driving and said driven member.

25. In a power transmitting apparatus, in combination with a plurality of intermeshing gears and coöperating electrical clutch devices, a clutch operating circuit, and a controlling device for said circuit comprising a driving member, a driven member, a yielding connection between said members, and means for throwing one or the other of said clutches into or out of said clutch operating circuit.

26. In a power transmitting apparatus, a plurality of electrically operated transmission devices and a torque-responsive mechanism for cutting each of said devices into or out of an operating circuit.

27. In a power transmitting apparatus, a driving part, a part to be driven therefrom and a speed change device comprising a plurality of sets of intermeshing gears, electrically operated clutch devices for controlling the operation of said gears, in combination with a driving connection which permits said driven part to lag behind said driving part during the operation of said apparatus, the degree of lag being dependent upon the load encountered and means dependent on the degree of lag for including one or another of said clutch devices in a clutch operating circuit whereby the effective turning moment of said speed change device is varied in direct proportion to the variations in load.

28. In a power transmission apparatus, a speed change device comprising a plurality of sets of intermeshing gears, electrically operated clutch devices for controlling the operation of each set of gears and a torque-responsive agent for including one or the other of said clutch devices in a clutch operating circuit, said agent comprising a driving member, a driven member and a yielding connection between said members.

29. In a power transmitting apparatus, a speed change device comprising a plurality of sets of intermeshing gears, an electrically operated clutch device for each set of gears, a torque-responsive agent comprising a driving member, a driven member and a yielding connection between said members for controlling the operation of said clutch device.

In testimony whereof, I have hereunto subscribed my name this tenth day of November, 1905.

EMIL E. KELLER.

Witnesses:
DAVID WILLIAMS,
JNO. S. GREEN.